J. L. Lowry,
Hydrant,
No. 1,026. Reissued Aug. 14, 1860.
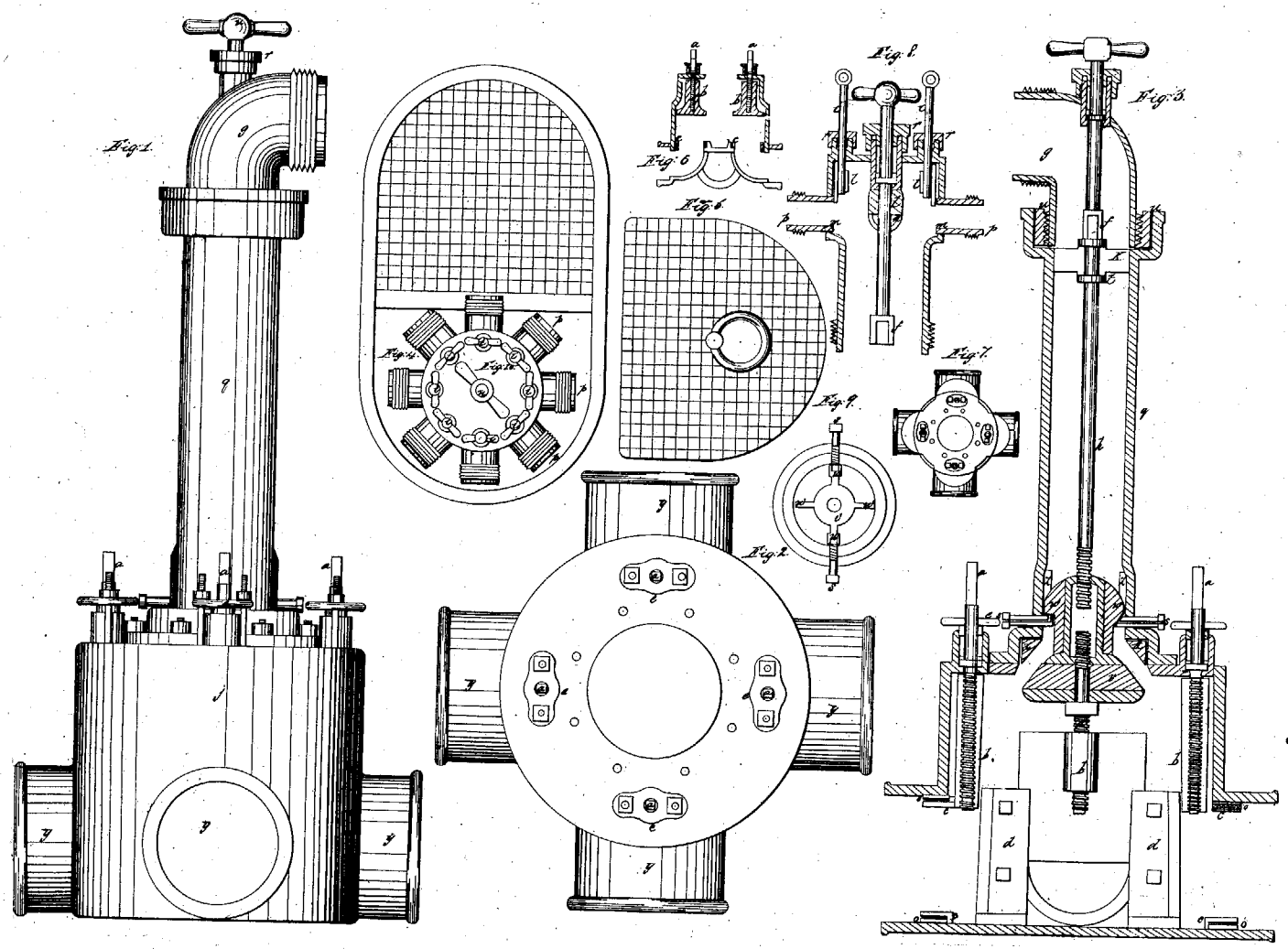
N. PETERS, PHOTO-LITHOGRAPHER, WASHINGTON, D.C.

UNITED STATES PATENT OFFICE.

JOSEPH L. LOWRY, OF PITTSBURG, PENNSYLVANIA.

IMPROVEMENT IN FIRE-PLUGS.

Specification forming part of Letters Patent No. 23,034, dated February 22, 1859; Reissue No. 1,026, dated August 14, 1860.

*To all whom it may concern:*

Be it known that I, JOSEPH L. LOWRY, of Pittsburg, in the county of Allegheny and State of Pennsylvania, have invented a new and Improved Attachment for Water-Works; and I do hereby declare that the following is a full, clear, and exact description of the same, reference being had to the accompanying drawings, forming a part of this specification, in which—

Figure 1 is an exterior view of the stop-cock, fire-plug, and the elbow for the steam fire-engine, put together in the way they are to be used. Fig. 2 is a top view of the stop-cock, the plug or cap being lifted off. Fig. 3 is an interior view of the stop-cock, fire-plug, and elbow. Fig. 4 is the frame or caps that cover the stop-cock and fire-plug. One of the caps is shown off. Fig. 5 is the cap lifted off when the plug is in service. Fig. 6 is a view of a stop-cock with puppet-valves, cut in two, so as to show its interior. Fig. 7 is a top view of the same stop-cock. Fig. 8 is a view of the branch for the hose, cut in two, so as to show its interior. Fig. 9 is a cross section of the plug, showing the valve of the same; and Fig. 10 is a top view of the same hose-branch screwed onto the plug.

Similar letters of reference in each of the several figures indicate corresponding parts.

*Stop-cock.*—*a a* are the screws or stems which open and shut the valves of the stop-cocks. *e e* are the glands or followers. *y y* are branches or bowl. *c c* are the valve-seats. *o o* are the rings fitted into the stop-cock. *b b* are the valves or gates. *d d* are the back bearings or slides.

*Fire-plug.*—In Figs. 1 and 3, *v v* is the valve. *x x* is the valve-seat. *w w* are the wings of the valve, *s s* are the set-screws. *h h* is the valve-rod. *t t* are the collars. *u u* is the female screw.

*Elbow or branch for the fire engine.*—*g g* is the elbow. *r r* are the glands. *n n* is the wrench or key.

*Hose-branch for the hand-engines.*—In Fig. 8, *i i* are the valve-rods. *l l* are the valves; *r r*, the glands; *n n*, the wrench or key. *m m* are the valve-seats. *p p* are the screws for hose. *f f* is the socket to catch the valve-rod *h* of the plug.

To enable others skilled in the art to make and use my invention, I will proceed to describe its construction and operation.

I construct my chamber *j* for the stop-cock, Figs. 2 and parts of 1 and 3, so that four valves or gates, *b b*, if necessary, of the size desired, have a sufficient room to operate in one chamber, *j*, which chamber may be cast cylindrical or otherwise. Cast on the chamber *j* are four branches or bowls, *y y*, to connect with the pipes in the sheets, corresponding to those of a cross-pipe, such as are now in common use. These branches *y y* may be cast on said chamber *j*, close to the bottom, as shown in Figs. 1 and 3, in which case the valve *b* will have to be shut down in order to close it or stop the flow of water, or said branches *y y* may be cast on said chamber *j*, close to the top, in which case the valve *b* will have to be raised up to close it or stop the flow of water in the pipe.

The valve-seat *c c* may either be leaded or fitted the ordinary way, if desired, but as they are liable to get out of order and attended with a great deal of expense and labor, the stop-cock now in general use having to be lifted, requiring the street to be dug open and the pipes cut. To avoid this trouble and expense, instead of leading or pinning in the valve-seat *c* permanently. I fit into the mouth of each branch *y y* in the chamber *j* a permanent brass ring, *o o*, Fig. 3, being more easily done than boring out the mouth of the said branch *y*. Inside of this brass ring *o* I cut a thread which corresponds with a thread cut on the outside of the valve-seat *c*. The valve-seat *c* can then be screwed into the ring *o*, similar to the manner in which hose attachments are made; or, secondly, instead of cutting a thread on the valve-seat or ring *o*, the valve-seat *c* and ring *o* can be turned with a slight taper, the larger end of the opening in the ring *o* being in the interior of the chamber *j*, so that said valve-seat *c* can be tightly set into said ring *o* from the interior of said chamber *j*; or, thirdly, if desired, to make greater security, the valve-seat *c* can have a number of screws inserted through the collars or rim of the valve seat *c* into the brass ring *o* or chamber *j*, the heads of said screws being sunk so as to cause no obstruction to the working of the valves *b* (lead or other matter might be used instead of brass, but I do not consider it so secure or permanent;) or, fourthly, the brass ring can be dispensed with by boring the branch *y*, so as to form an even face for the valve-seat *c*. The mouth of said branch can be bored or cut with a screw so as to answer the purpose for which the ring *o* is applied. By this arrangement the chamber *j* and fire-plug *g*, being surrounded by a box, such as is now in common use, the fire-plug (answering the purpose of a cap to the chamber *j*) can be unscrewed and detached from the chamber or stop-cock *j*, leaving an opening sufficiently large to take out the valve *b* or the valve-seat *c*, or replace the same or insert new ones without disturbing the pipes or any part thereof.

*Fire-plug.*—I construct my fire-plug, Figs. 1 and 3, *q q*, so as either to sit directly on the main or cross pipes, as now used, or on my stop-cock *j*, which answers the purpose of a cross-pipe. The valve *v*, Fig. 3, and valve-seat *x* is constructed similar to that in use, being a conical-shaped leather valve with this difference: On the upper washer that holds together the leather valve I cast four wings, *w w*, of sufficient diameter or width to keep the valve in the center of the fire-plug *q q*. A short distance from the upper end two of the wings *w w* are contracted in width or diameter so as to form a T or wedge shaped head or shoulder, as is shown in the draft. In the inside of the plug *q q*, close above the valve-seat *x*, are cast opposite each other two little guards or slides, *z*. Between these slides the wings *w w* move up and down the guard *z*, preventing the valve *v* from turning round by motion of the valve-rod *h*. Between the slides *z* at the lower end are two set-screws, *s s*. Through the center, lengthwise, in one or both there is a small hole drilled, which acts as a waste cock. When the plug *q q* is shut, the wings *w w* are raised off the set-screws *s s*, giving room for the waste-water to pass out. When the plug is opened, the valve-rod *h* being turned round, the collar *t t* acts against the bar *k*, which is cast in the upper end of the plug *q q*, preventing the rod *h* from rising or falling, the screw on the lower end of the rod, acting in a nut either in the valve *v* or in a nut cut in the rod *h* above the valve *v*, forces the valve *v* down till the wings *w w* rest on the set-screws *s s*, closing the waste cock or hole *s s*, and opening the plug *q*. The upper end of the plug *q* is cast with a bowl. Into this bowl there is fitted a brass screw, *w w*, corresponding with a screw on the hose-branch, Figs. 8 and 10, and elbow, letter *g*. When the plug *q* is used, the hose branch or elbow is screwed into the plug *q*, the wrench or key *n*, having a square socket, *f f*, which, when pressed down, catches on the head of the valve-rod *h h*, by turning the key or wrench *n n*, the valve *v* is raised or depressed at pleasure. The elbow *g g* is a single bent tube or pipe with a screw on each end, the one to screw into the plug *q*, and the other screw, *u*, to attach the hose or suction pipes.

The hose-branch, Figs. 10 and 8, is intended for the use of hose companies and hand-engines and may be cast in one piece, boring out the chamber and use circular valves, or cast the chamber and branches separate. Screws are cut in each end of the branch *p p*, as is shown in Fig. 8—the one to attach the hose *p p*, and the other to screw the branch fast to the chamber. The end that is screwed into the chamber is placed so as to answer for valve-seats *m m*. The pressure of the water being from the inside, guards are not needed to keep the valves *l l* to their seats.

The difficulty in making attachments in time of fire, in entering the male screw *p* into the female screw, owing to their having the threads continued to the end or point, causing delay and trouble, I would remedy by carrying the thread of the male screw *p* and female screw *u* to within one-fourth to one-half inch of the end of either or both of them so that the male screw *p* enters sufficiently far as to keep the screws from slipping and in line with each other.

It will be observed that the hose branch has a vertical extension, *s*, of about eighteen inches in length below the hose-nozzles. This extension enters the ground about three inches, and thus the hose-nozzle is elevated above the surface of the ground. Often an attachment is made more than a foot. Thus elevating the nozzles gives great convenience for attaching the hose.

The difference between my chamber *j* and the chamber of the stop-cock now in use is, mine is constructed so as to answer the double purpose of the cross-pipe and either one, two or three or more of the chambers of the stop-cocks now in use, being easier to fit up and not more than half the weight of iron, requiring but one box and cap to cover the whole—viz., fire-plug and stop-cock. Those now in use, being single, require the cross-pipe to connect them and also a separate box and cap to cover each one of them. They having their valve-seats permanently fitted in the chamber cannot be repaired without first digging open the streets and lifting the stop cock. Mine, on the contrary, is so arranged that the valve-seat can be taken out of the chamber at pleasure, without disturbing the pipes or stop-cock.

The difference between my fire-plug and those in use is, the latter being set on the pavement and the water-pipes being laid in the middle of the street, it requires a pipe extending from said main pipe in the street to the plug on the pavement to form a connection. When the plug is shut, the water in this connecting-pipe has no circulation, flow, or motion, and freezes in severely cold weather, and the opening in the plug for the emission of water when the hose is attached being but two inches in diameter. On the contrary, my plug, being set directly on the main pipe or chamber of the stop-cock, dispenses with this connecting-pipe, and the constant flow of water under the plug prevents its freezing, having the benefit of the four pipes connecting in said chamber, the combined area of the four four-inch pipes (being the smallest now in use) being fifty inches—equal in area to an eight-inch pipe, or sufficient to supply the emission of an eight-inch plug instead of two-inch, as now in use, thus dispensing with the necessity of using the quantity of hose now required, as my nearest plug will give a stream of water equal to several plugs situated in different parts of the city or corporation, to each of which a hose has now to be extended.

My fire-plug, when placed in the center of the cross streets, which is a point of easy access and cannot be mistaken, is not intended to project above the surface, but will be covered with a cap, as in Fig. 4. Vehicles can pass over without interruption, the cap covering the stop-cock and fire-plug.

My valve, *b* Fig. 3, and the one in use differs in this: The latter is faced on both sides with two seats for each valve. The former, on the contrary, requires to be faced on one side with but one seat, the guards or slides *d* keeping the valve *b* up to its seat *c*, instead of the extra face and seat, as now required, the screw operating in the valve similar to the valve as in the stop-cock, now in use.

What I claim as my invention, and desire to secure by Letters Patent, is—

1. The construction of the chamber *j* so as to make it answer the double purpose of a through-way for one or more branch pipes, and a readily accessible chamber for the reception of a valve or valves, thus making one pit and one cover common to two, three, four, or more mains, instead of several, as now required, all substantially as set forth.

2. Combining a fire-plug with the chamber *j* and its branches when the valve *v* is located as described, for the purpose of effecting a circulation of the water under the valve of the fire-plug to prevent its freezing.

3. The combination, with the fire-plug and chamber *j* and branch pipes, of the detachable many-valved hose-branch, Figs. 8 and 10, when the said parts are constructed as described and arranged, so that the nozzles of the hose-branch stand at a convenient height above ground for attaching the hose, substantially as herein shown and described.

4. The removable gasket *c* in the ends of the branches or bowls *y*, so as to renew the seats for the valves *b* when necessary without disturbing the main or stop-cock, access to these gaskets being through the common chamber *j*, as herein stated.

JOSEPH L. LOWRY.

Witnesses:

GOODWIN Y. AT LEE,

R. W. FENWICK.